T. H. WARD & C. R. YERRICK.
DISENGAGING DEVICE FOR MOTOR DRIVEN VALVES.
APPLICATION FILED MAY 5, 1908.
928,720.
Patented July 20, 1909.
2 SHEETS—SHEET 1.
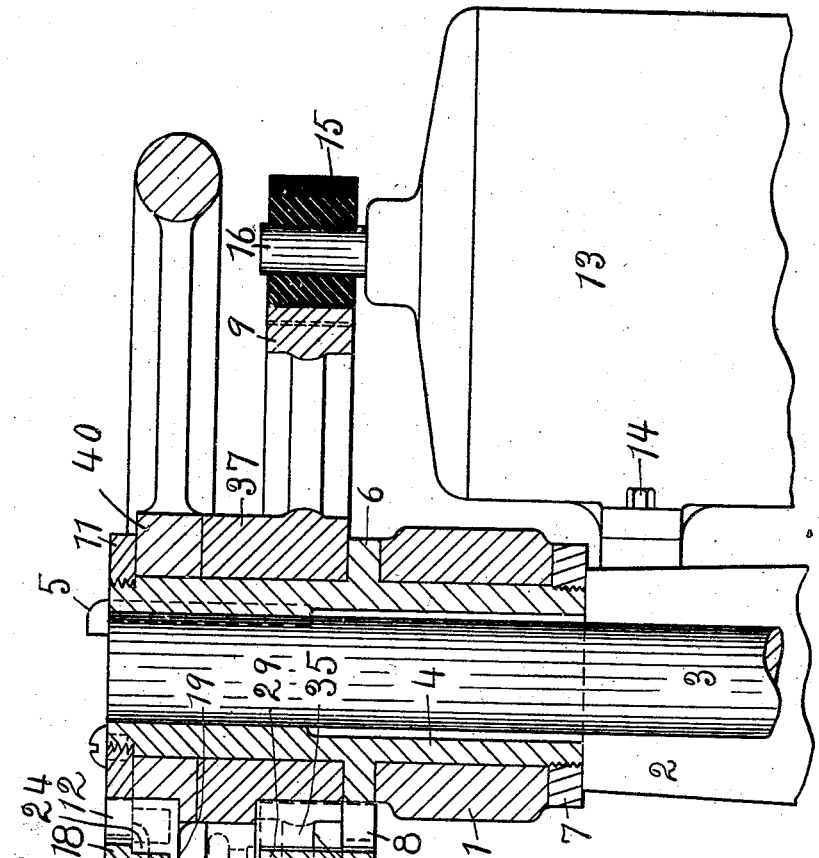
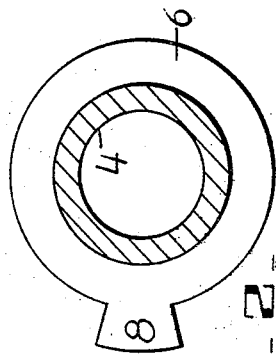
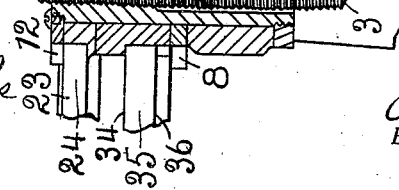
WITNESSES:
A. C. Fairbanks
J. M. Sterne
INVENTORS
Thomas H. Ward
Charles R. Yerrick,
BY
Webster & Co.,
ATTORNEYS T. H. WARD & C. R. YERRICK.
DISENGAGING DEVICE FOR MOTOR DRIVEN VALVES.
APPLICATION FILED MAY 5, 1908.
928,720.
Patented July 20, 1909.
2 SHEETS—SHEET 2.
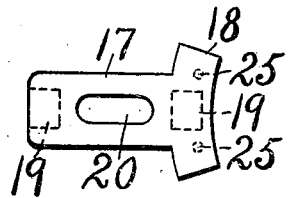
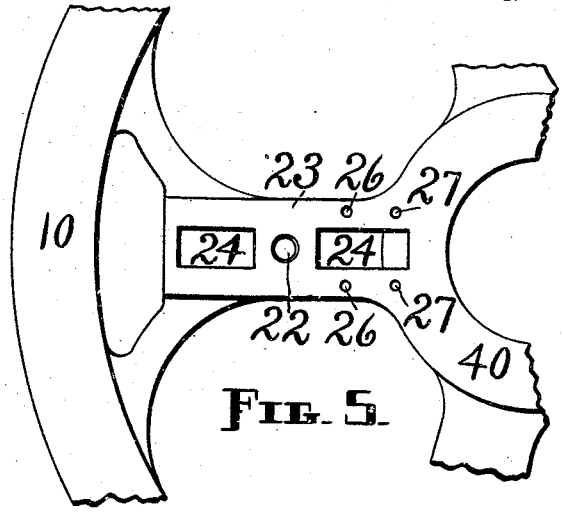
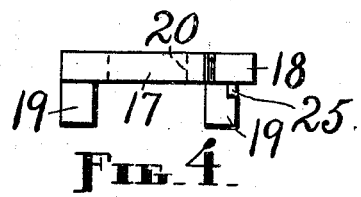
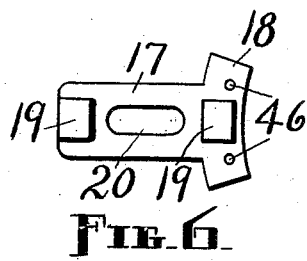
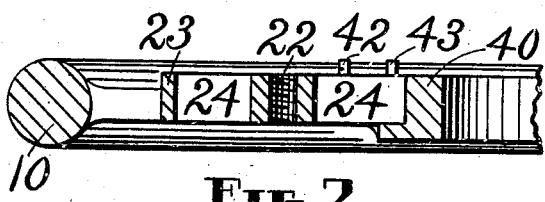
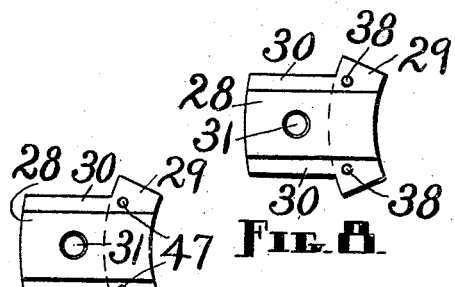
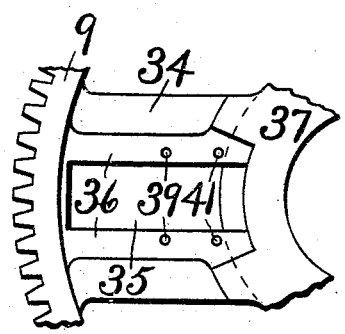
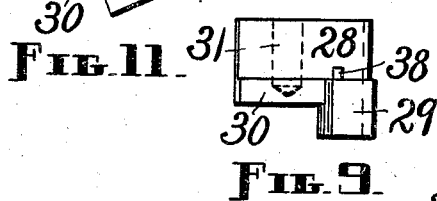
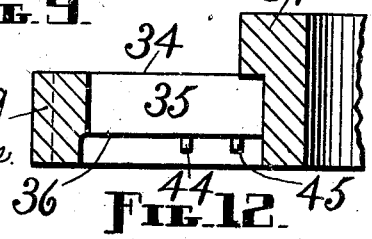
WITNESSES:
A. C. Fairbanks.
J. M. Sterne
INVENTORS
Thomas H. Ward,
Charles R. Yerrick,
BY
Webster & Co.,
ATTORNEYS

UNITED STATES PATENT OFFICE.

THOMAS H. WARD, OF SPRINGFIELD, MASSACHUSETTS, AND CHARLES R. YERRICK, OF DANVILLE, PENNSYLVANIA, ASSIGNORS TO CHAPMAN VALVE MANUFACTURING COMPANY, OF INDIAN ORCHARD, MASSACHUSETTS, A CORPORATION OF MASSACHUSETTS.

DISENGAGING DEVICE FOR MOTOR-DRIVEN VALVES.

No. 928,720.   Specification of Letters Patent.   Patented July 20, 1909.

Application filed May 5, 1908. Serial No. 431,042.

*To all whom it may concern:*

Be it known that we, THOMAS H. WARD, residing at Springfield, in the county of Hampden and State of Massachusetts, and CHARLES R. YERRICK, residing at Danville, in the county of Montour and State of Pennsylvania, both citizens of the United States of America, have invented new and useful Improvements in Disengaging Devices for Motor-Driven Valves, of which the following is a specification.

Our invention relates to improvements in means for connecting and disconnecting the driving-gear and the hand-wheel with and from the spindle of a motor-driven valve, such connection being for the purpose of actuating said spindle through the medium of said gear or hand-wheel, as the case may be; and to this end we provide each of said actuating members with a certain peculiar bolt, lock or latch which is adjustable in and out of the path of travel of a "bump" or lug on the spindle sleeve, and means to secure such latch in either position, all as hereinafter set forth.

The objects of our invention are, first, to provide comparatively simple and inexpensive devices, of the class specified above, which are at the same time strong, durable and efficient, and positive when in operative connection with the sleeve of the valve-spindle; second, to provide disengaging devices which can be easily and quickly adjusted, and, third, to afford convenient means for securing such devices after adjustment and releasing them for adjustment. We attain these objects by the means illustrated in the accompanying drawings, in which—

Figure 1 is a sectional view of the upper part of a valve mechanism with which our invention is incorporated, a portion of the motor which drives such mechanism being shown in elevation; Fig. 2, a cross-section through the valve-spindle sleeve showing the lug thereon; Fig. 3, a plan view of the hand-wheel latch; Fig. 4, a side elevation of said latch; Fig. 5, a plan view of that part of the hand-wheel with which the aforesaid latch is connected; Fig. 6, a bottom view of said hand-wheel latch, showing holes in place of pins; Fig. 7, a sectional view of the aforesaid part of said hand-wheel, showing pins in place of holes; Fig. 8, a plan view of the driving-gear latch; Fig. 9, a side elevation of said last-mentioned latch; Fig. 10, an underside view of that part of said gear with which the latch therefor is connected; Fig. 11, a view similar to Fig. 8, excepting that there are holes instead of pins; Fig. 12, a sectional view of the aforesaid part of the gear, showing pins in lieu of holes; and, Fig. 13, a sectional view on a reduced scale of an outside-screw mechanism.

Similar figures refer to similar parts throughout the several views.

Before proceeding to describe our invention in detail and as illustrated in the drawings, it will be well to state, first, that, although both of the latch mechanisms will be employed by preference with any given valve for obvious reasons, either can be omitted, and, second, that, while the two devices vary somewhat in construction, such variation relates rather to application or adaptability than to mechanical difference, the general construction, mode of operation, and results produced being substantially identical in both cases. In each there is a latch slidingly mounted in relation to the rotary actuating member for the valve spindle, and a hand-screw arranged to bind the latch to the said actuating member with which said latch is connected, at either end of its longitudinal travel, and to release it, together with other features common to both devices.

The parts of the valve mechanism shown in Fig. 1, which are old with the exception of the necessary structural alterations in or additions to the valve-spindle-actuating members, to be described presently, consist of a yoke-head 1 and part of a yoke 2, the upper terminal of a valve-spindle 3, a sleeve 4 keyed to said spindle at 5 and secured in said yoke-head by an integral flange 6 above and a lock-ring 7 below, said flange having a bump or lug 8 projecting from one side thereof, a driving-gear 9 loose on said sleeve above the flange, a hand-wheel 10 loose on the sleeve above said gear, a lock-ring 11 tight on the sleeve above said hand-wheel, said last-mentioned ring having a bump or lug 12 similar to said lug 8, the upper part of a motor 13 bolted at 14 to said yoke, and a pinion 15 tight on the motor shaft 16 and in mesh with the gear 9.

By connecting the driving-gear 9 with the sleeve 4 the spindle can be revolved from the motor 13 through the medium of the pinion 15, and by disconnecting said gear and connecting the hand-wheel 10 said sleeve and spindle can be rotated by means of said hand-wheel. When the driving-gear is the actuating medium for the spindle it is desirable that the hand-wheel be disconnected, since it then requires less power to start the spindle with the motor, very little momentum on the part of the hand-wheel has to be overcome when the spindle stops, and shock and jar are avoided.

The hand-wheel-latch mechanism comprises a body 17 provided with a segmental head 18 and two bottom lugs 19 and having a longitudinal slot 20 therein, and a hand-screw 21 passing downward through said slot into a tapped hole 22 in the center of an arm 23 of the hand-wheel 10. The arm 23 is slotted at 24—24 to receive the lugs 19 and form guides therefor and for the latch body and head which ride on said arm. The inner slot 24 extends partway into the hub 40 of the hand-wheel. This latch may also be provided with one or two pins 25 depending from the head 18, and if so holes 26 and 27 are respectively arranged in the arm 23 to receive said pins when the latch is positioned with the head out of the path of travel of the lock-ring lug 12 and when positioned with its head in such path. The purpose of the pins 25 is to add greater security to the latch and preclude any possibility of its getting loose especially in the event that said latch be not properly secured by the hand-screw 21, but these pins and the holes therefor in the arm 23 are not required when said hand-screw is to be depended on solely to hold the latch in place, and the same is true in regard to similar pins and holes which may be used with the driving-gear-latch mechanism and which will be more specifically mentioned in the course of this description.

The driving-gear-latch mechanism comprises a body 28 provided at the bottom with a segmental head 29 and lateral flanges 30—30 and having a vertical tapped hole 31 therein, a hand-screw 32, and a washer 33. One of the arms, 34, of the driving-gear 9 has a longitudinal slot 35 therein to receive and guide the latch body 28, and on the underside of said arm along the longitudinal edges of said slot ways or bearing-faces 36 are formed for the flanges 30. Both the slot 35 and the bearing-faces 36 extend a short distance into the hub 37 of said gear. The height of the body 28 above the flanges 30 is less than that of the slot 35.

As already intimated, the latch last described may be provided with one or more lock-pins as well as that which was first described, such pins being represented at 38 as rising from the head 29. Suitably arranged holes 39 and 41 are made in the bearing-faces 36 to receive the pins 38, the holes 39 receiving said pins when the latch is in its inoperative or inactive position and the holes 41 receiving said pins when said latch is in its operative or active position with the head 29 in the path of travel of the sleeve lug 8.

Having described the construction of the two forms of our invention herein shown, we will now explain briefly in what manner the same are operated, it being assumed that the latches stand in their inoperative positions, as shown in full lines in the first view. To bring the spindle 3 under the control of the motor 13, unscrew the hand-screw 32 until the latch head 29 drops below the bearing-faces 36 a sufficient distance to enable the pins 38 to clear the edges of the holes 39, move the body 28 inward in the slot 35, and refasten with said hand-screw by rotating it in the right direction to elevate the latch, with said pins in the holes 41, and to cause the arm 34 to be tightly grasped between the flanges 30 and the washer 33. The latch now stands as indicated by broken lines in Fig. 1, with the head 29 in the path of travel of the lug 8 with which said head contacts when the driving-gear 9 is revolved, thus imparting motion to the sleeve 4 and the connected spindle. To change from the motor 13 to the hand-wheel 10, restore the gear latch to its former position by loosening the hand-screw 32, moving said latch outward, and again tightening said hand-screw, the pins 38 being once more in the holes 39; and station the upper latch in operative position with its head 18 in the path of travel of the lug 12, by loosening the hand-screw 21 sufficiently to enable the body 17 to be raised until the pins 25 clear the edges of the holes 26, moving said body inward, the lugs 19 sliding in the slots 24, and again tightening the hand-screw to bind said body to the arm 23, said pins now being in the holes 27. The sleeve with its spindle can be now rotated by means of the hand-wheel. In thus adjusting the hand-wheel latch the latter is moved from the position shown in full lines to that indicated by broken lines in Fig. 1. It will be understood that, when the latches are positioned at the outer ends of their longitudinal movement, their heads are out of the paths of travel of the lugs with which they contact when in their inward positions.

The lock-pins might, of course, be affixed to the actuating members instead of to the latches, in which event the holes for such pins would be in said latches, as shown in Figs. 6 and 7, and 11 and 12, wherein lock-pins appear at 42 and 43 in Fig. 7, and at 44 and 45 in Fig. 12, and the holes appear at 46 in Fig. 6, and at 47 in Fig. 11.

In the absence of the lock-pins, less movement of the hand-screws is required to bind and release the latches.

Our invention is as applicable to an outside-screw construction, like that shown in Fig. 9, as to the inside-screw construction of the first view, hence may be employed with both types of valves with equally good results.

We are aware that devices for a similar purpose although of a different construction have been used, therefore we do not seek to claim broadly a disconnecting device for motor-driven valves.

What we do claim as our invention, and desire to secure by Letters Patent, is—

1. The combination, in a device of the class described, with a valve-spindle, and a rotary member therefor provided with a lug, of a revoluble actuating member, for such spindle, provided with a latch having endwise movement and adapted to be positioned in and out of the path of travel of said lug, a hand-screw arranged to bind said latch to said actuating member and to release it from such binding contact, and a lock-pin arranged to hold the latch against outward displacement when in said path of travel of the lug.

2. The combination, in a device of the class described, with a valve-spindle, and a rotary member therefor provided with a lug, of a revoluble actuating member, for such spindle, provided with a latch having endwise movement and adapted to be positioned in and out of the path of travel of said lug, a hand-screw arranged to bind said latch to said actuating member and to release it from such binding contact, and a lock-pin arranged to hold the latch against outward displacement when in said path of travel of the lug and against inward displacement when at the opposite end of its adjustment.

3. The combination, in a device of the class described, with a valve-spindle, and a rotary member therefor provided with a lug, of a revoluble actuating member for such spindle, said actuating member having a radially slotted arm, a latch so connected with said arm that it is capable of endwise movement relative thereto and radial to said valve-spindle and is adapted to be positioned in and out of the path of travel of said lug, a part of said latch extending into and sliding in the arm slot to guide the latch, and a hand-screw arranged to bind the latch to the arm and to release it from such binding contact at either end of the travel of the latch.

4. The combination, with a valve-spindle, and a suitably supported sleeve operatively connected with such spindle, such sleeve being provided with a lug, of a gear, loose on said sleeve adjacent to said lug, having a slotted arm, a latch body in the arm slot, such body being shorter and of less height than said slot and having lateral flanges to bear against the underside of said arm and a head, the latter being adapted to engage said lug when in the path of travel thereof, a hand-screw tapped into such latch, and a washer on said screw between the top of the arm and the head of the screw, said hand-screw and washer being capable of securing and releasing said latch at either end of its endwise travel to retain said head either out of or in the aforesaid path of travel of the lug.

5. The combination, with a valve-spindle, and a suitably supported lug-provided sleeve operatively connected with such spindle, of a gear having a radially slotted arm and mounted loose on such sleeve, a longitudinally-movable latch connected with such arm and radial to said valve spindle, a part of said latch extending into and sliding in the arm slot to guide the latch, a hand-screw adapted to secure said latch either in or out of the path of travel of one of the sleeve lugs, a hand-wheel also having a radially slotted arm and mounted loose on such sleeve, a longitudinally-movable latch connected with such slotted hand-wheel arm and like the first-mentioned latch radial to said valve-spindle, a part of said last-mentioned latch extending into and sliding in the hand-wheel arm slot to guide the latch, and a hand-screw adapted to secure the hand-wheel latch either in or out of the path of travel of a second sleeve lug.

THOMAS H. WARD.
CHARLES R. YERRICK.

Witnesses as to signature of Thomas H. Ward:
    F. A. Cutter,
    A. C. Fairbanks.

Witnesses as to signature of Charles R. Yerrick:
    A. H. Grone,
    Jos. S. Lowenstein.